(12) United States Patent
Liu et al.

(10) Patent No.: US 7,746,811 B2
(45) Date of Patent: Jun. 29, 2010

(54) TIME SHARED BI-DIRECTIONAL SERIAL SIGNALING SYSTEM

(75) Inventors: Xin Liu, Mountain View, CA (US); Qingping Zheng, Saratoga, CA (US); John Goldie, San Carlos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 376 days.

(21) Appl. No.: 11/951,631

(22) Filed: Dec. 6, 2007

(65) Prior Publication Data

US 2009/0147708 A1    Jun. 11, 2009

(51) Int. Cl.
H04B 1/52 (2006.01)
(52) U.S. Cl. ....................... 370/284; 370/294
(58) Field of Classification Search ................. 370/276, 370/282, 284, 294, 463, 468, 503
See application file for complete search history.

(56) References Cited

U.S. PATENT DOCUMENTS

| 6,408,033 B1 * | 6/2002 | Chow et al. ................. 375/260 |
| 6,577,617 B1 * | 6/2003 | Ue et al. ...................... 370/347 |
| 7,317,713 B2 * | 1/2008 | Taniguchi .................... 370/345 |
| 7,522,924 B2 * | 4/2009 | Abeta et al. ............... 455/452.2 |
| 2008/0089337 A1 * | 4/2008 | Schaefer ..................... 370/392 |

* cited by examiner

*Primary Examiner*—Ricky Ngo
*Assistant Examiner*—Christine Ng
(74) *Attorney, Agent, or Firm*—Vedder Price, P.C.

(57) ABSTRACT

A time shared bi-directional serial signaling system providing a differential signal with apparent duplex signal operation for higher and lower bandwidth data signals in a forward direction and another lower bandwidth data signal in a return direction.

13 Claims, 4 Drawing Sheets

TIME SHARED BI-DIRECTIONAL SERIAL SIGNALING SYSTEM

BACKGROUND

1. Field of the Invention

The present invention relates to systems communicating via serial signals, and in particular, to systems requiring communication of serial signals in forward and reverse directions.

2. Related Art

While levels of integration have increased dramatically in recent years, thereby producing integrated circuits with multiple subsystems integrated within a single die, full integration of complete systems, while potentially possible, is not yet generally practiced. As a result, electronic products, such as cellular telephones, computer systems, digital video systems, etc., rely on "chipsets" in which multiple integrated circuits, or chips, communicate with one another to provide the desired functions and operations. Due to the increased integration of subsystems within each of the chips making up the chipset, it is often necessary to have multiple signals communicated between the chips.

Referring to FIG. 1, for example, in a chipset having at least two chips, a host 10 and a target 12, it is often necessary for the host 10 to transmit high speed data 11a and low speed data 11b to the target 12, while also being able to receive low speed data 11c in return from the target 12. Often, to increase transfer speeds, such data signals 11a, 11b, 11c are transmitted as parallel signals between the host 10 and target 12. Including issues regarding timing among the signals as well as skewing of signal edges, this type of interface tends to be larger, heavier and more costly due to the number of electrical connections, cables and connectors. Accordingly, it would be desirable to have a simpler interface for communications between chips within a chipset.

SUMMARY

In accordance with the presently claimed invention, a time shared bi-directional serial signaling system is provided for a differential signal with apparent duplex signal operation for higher and lower bandwidth data signals in a forward direction and another lower bandwidth data signal in a return direction.

In accordance with one embodiment of the presently claimed invention, a time shared bi-directional serial signaling system includes:

a differential signal path to convey a serial data signal having a data signal interval including first, second and third subintervals and an embedded clock;

host transceiver circuitry coupled to the differential signal path, responsive to reception of a data clock, a plurality of primary forward data and a plurality of secondary forward data by providing primary and secondary forward portions of the serial data signal and the embedded clock as a forward portion of the serial data signal during at least the first and second subintervals, and responsive to reception of a return portion of the serial data signal by retrieving a plurality of return data; and target transceiver circuitry coupled to the differential signal path, responsive to reception of the forward portion of the serial data signal by retrieving the data clock, the plurality of primary forward data and the plurality of secondary forward data, and responsive to reception of a plurality of return data by providing the return portion of the serial data signal during the third subinterval.

In accordance with another embodiment of the presently claimed invention, a time shared bi-directional serial signaling system includes:

differential signal means for conveying a serial data signal having a data signal interval including first, second and third subintervals and an embedded clock;

host transceiver means for receiving a data clock, a plurality of primary forward data and a plurality of secondary forward data and in response thereto providing primary and secondary forward portions of the serial data signal and the embedded clock as a forward portion of the serial data signal during at least the first and second subintervals, and for receiving a return portion of the serial data signal and in response thereto retrieving a plurality of return data; and target transceiver means for receiving the forward portion of the serial data signal and in response thereto retrieving the data clock, the plurality of primary forward data and the plurality of secondary forward data, and for receiving a plurality of return data and in response thereto providing the return portion of the serial data signal during the third subinterval.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

As discussed in more detail below, the presently claimed invention is particularly useful for serial signaling systems for which it is desirable or necessary to communicate data and bi-directional control signals via a common AC coupled differential signal path. In accordance with the presently claimed invention, an embedded clock is used with a zero-to-one signal transition embedded within one symbol, with high speed serialized forward data, low speed serialized forward control data and low speed serialized return control data sharing different time slots within the symbol. As a result, the signal interface appears to provide full duplex communication over a single communication path, e.g., a single twisted pair of conductors. Additionally, multiple data and control signal buses are consolidated into a single signal link, thereby significantly improving system design by minimizing signal skew problems, the number of signal connections, the number of cables and connectors, and reducing overall interconnections, size, weight and cost.

Figure 1:
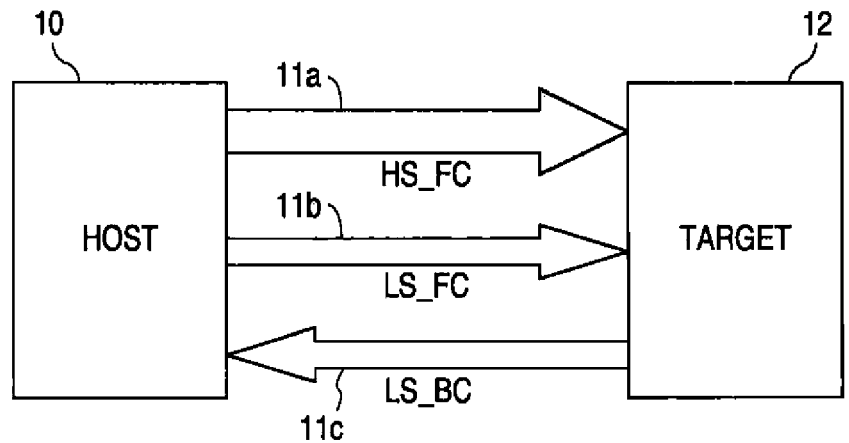
FIG. 1 is a functional block diagram of a conventional signal interface for a chipset.
Figure 2:
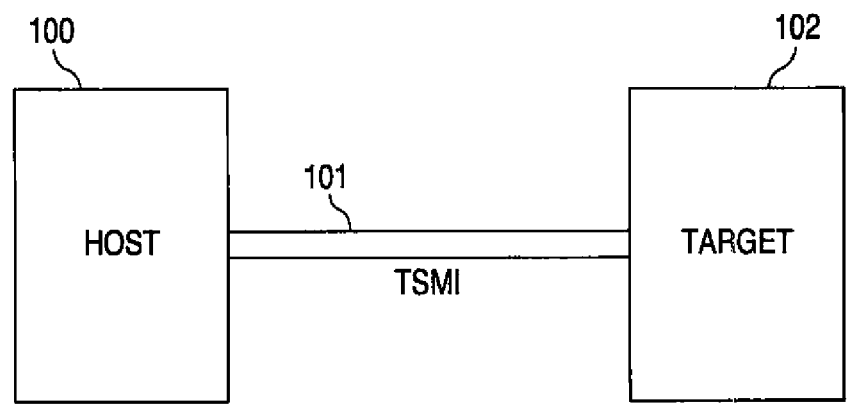
FIG. 2 is a functional block diagram of a serial signal interface for a chipset in accordance with one embodiment of the presently claimed invention.

Referring to FIG. 2, the host 100 and target 102 communicate via a time shared multi-interface (TSMI) link 101. As discussed in more detail below, a serializer embeds the clock, balances the data payload, and shifts the signal levels to a high speed, low voltage differential signal format. A de-serializer recovers the data and control signals and extracts the embedded clock from the serial bit stream. No reference clock is required, and a link status output signal is provided. Accordingly, the control data bus appears to operate in full duplex mode with low signal latency when the link 101 is running. The control data is transmitted in an encoded and balanced format for signal optimization. A sleep mode can be supported with remote wake and interrupt capabilities.

Figure 3:
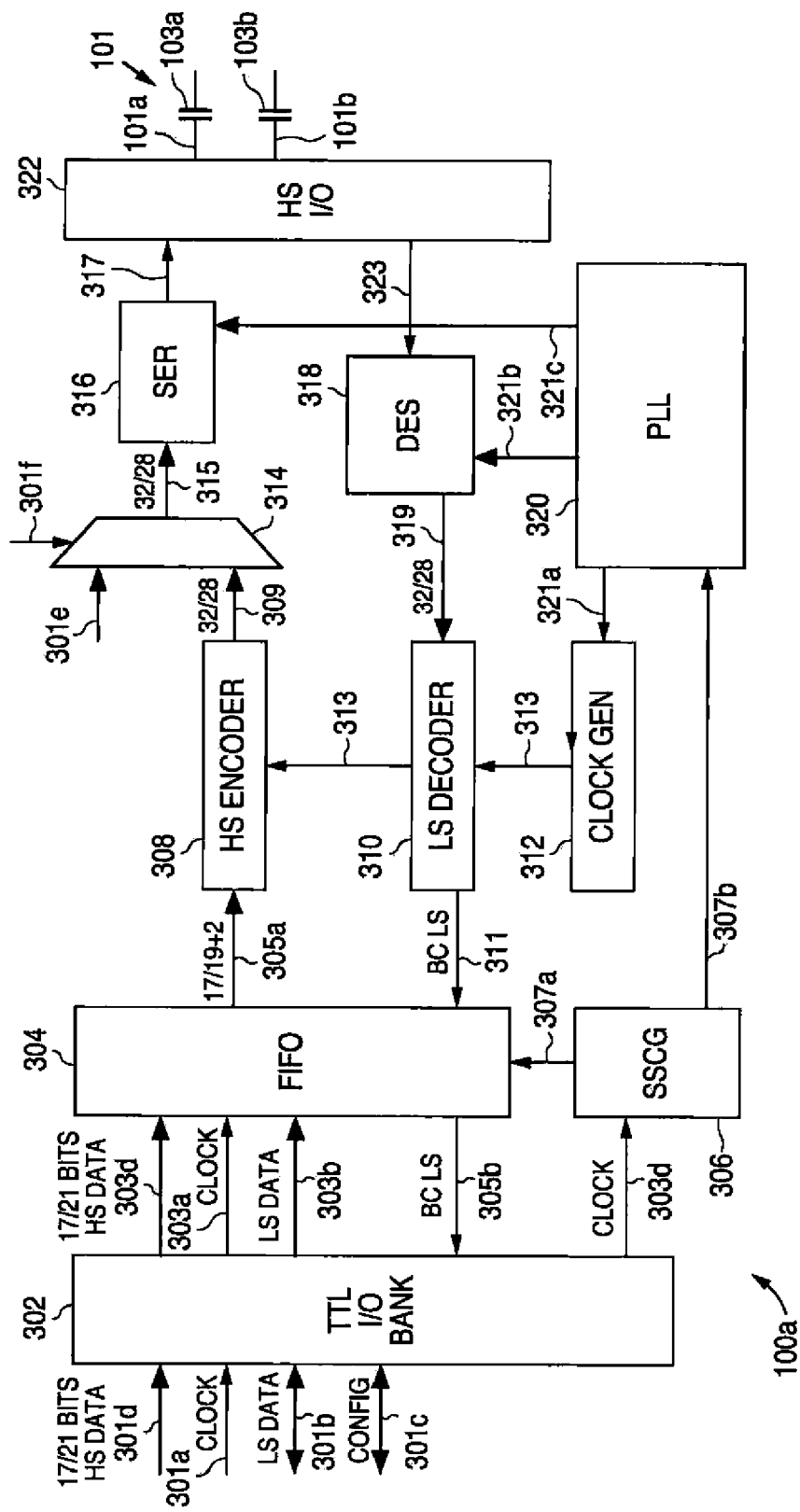
FIG. 3 is a functional block diagram of one example embodiment of the host chip of FIG. 2.

Referring to FIG. 3, one example embodiment 100a of the host chip of FIG. 2 includes internal interface circuitry 302, memory circuitry 304 (e.g., first-in-first-out), spread spectrum clock generator circuitry 306, high speed encoder circuitry 308, low speed decoder circuitry 310, clock generator circuitry 312, multiplexor circuitry 314, serializer circuitry 316, de-serializer circuitry 318, phase lock loop (PLL) circuitry 320, and external interface circuitry 322, all interconnected substantially as shown. The internal interface circuitry 302 receives a clock signal 301a and high speed data 301d from elsewhere within the host 100, and exchanges low speed data 301b and configuration data 301c with other portions of the host 100. The external interface circuitry 322, as discussed in more detail below, receives serialized outgoing data 317 for transmission via the serial interface link 101. The interface link 101 includes two signal lines 101a, 101b which are AC coupled via coupling capacitors 103a, 103b. This interface circuitry 322 also receives incoming data via the serial signal link 101, and provides this serial data 323 to the de-serializer circuitry 318.

The internal clock signal 301a is buffered by the internal interface 302 and provided as a clock signal 303d to the spread spectrum clock generator 306. In turn, this clock generator 306 provides related clock signals 307a, 307b to the memory 304 and PLL 320, modified as desired, e.g., in magnitude or phase. The PLL 320, in turn, provides a further related clock signal 321a to the clock generator 312 and multiple clock signals 321b, 321c for the de-serializer 318 and serializer 316. (Thinner signal lines indicate single signals, while thicker signal lines indicate multiple, e.g., parallel, signals.)

The clock generator 312, in turn, provides another clock signal 313 for the high speed encoder 308 and low speed decoder 310.

The memory 304, in accordance with its clock signal 307a, receives and stores the outgoing high speed data 303d, clock 303a and low speed data 303b, which are provided as a multi-bit signal 305a to the high speed encoder 308.

The high speed encoder 308, in accordance with its clock signal 313, encodes these signal bits 305a to produce the outgoing data and clock bits 309 to the multiplexor 314. In accordance with a control signal 301f, the multiplexor 314 selects between the outgoing data and clock bits 309 and other data 301e (e.g., test data), with the resulting selected signal bits 315 being provided to the serializer 316. The serializer 316 embeds the clock and balances the data payload to provide the serialized data signal 317 to the external interface 322 which provides shifting of the signal levels for the serial link 101. In accordance with a preferred embodiment of the presently claimed invention, the external interface circuitry 322 is a low voltage differential signal (LVDS) circuit.

The incoming serial data 323 is de-serialized by the de-serializer 318 in accordance with its clock signals 321b to provide de-serialized data 319 to the low speed decoder. The low speed decoder 310 decodes this data 319 in accordance with its clock signal 313 to provide the return low speed data 311 to the memory 304. In turn, in accordance with its clock signal 307a, the memory 304 provides this return low speed data 305b to the internal interface 302 for communication to other portions of the host 100.

Figure 4:
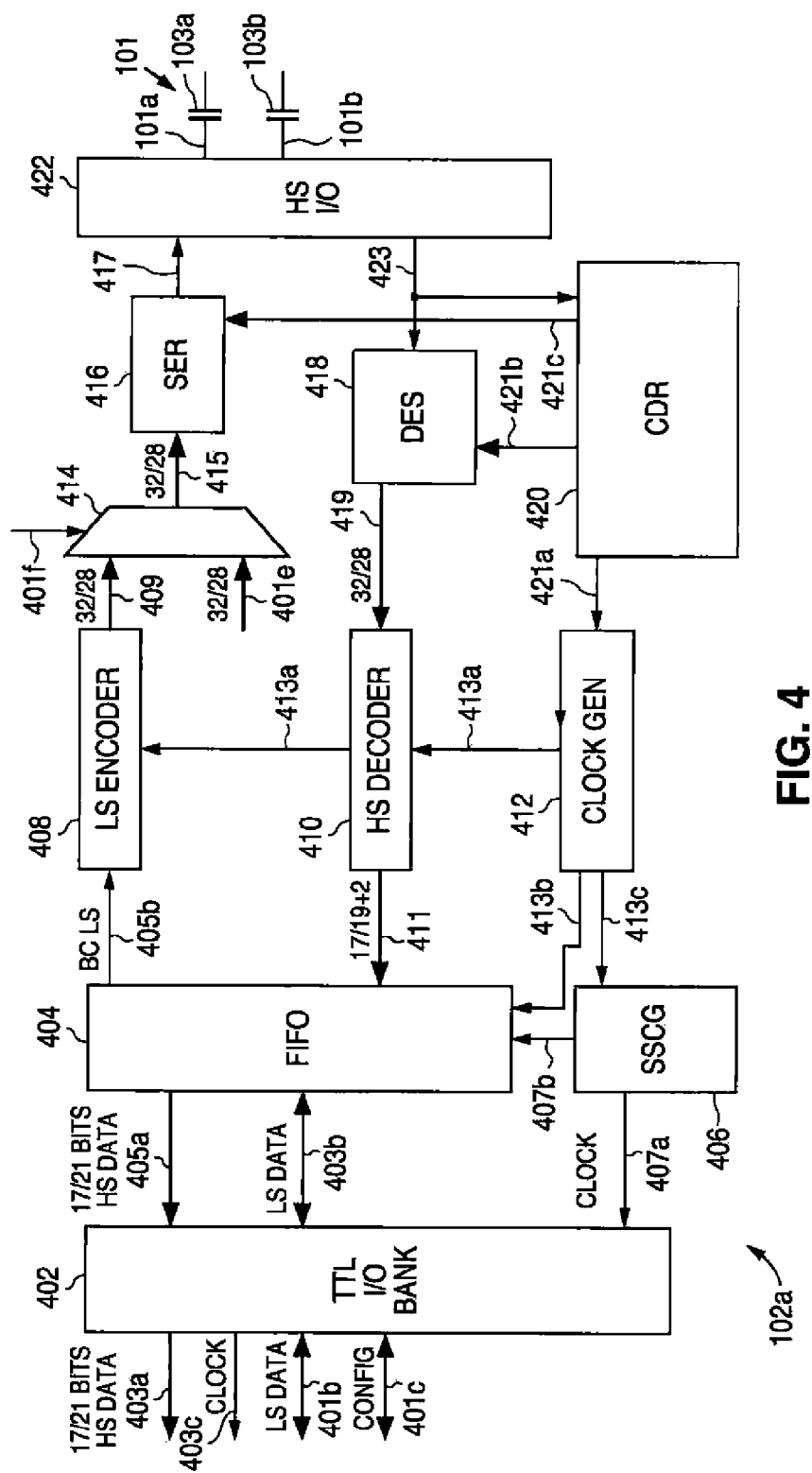
FIG. 4 is a functional block diagram of one example embodiment of the target chip of FIG. 2.

Referring to FIG. 4, one example embodiment 102a of the target 102 of FIG. 2 includes internal interface circuitry 402, memory circuitry 404 (e.g., first-in-first-out), spread spectrum clock generator circuitry 406, low speed encoder circuitry 408, high speed decoder circuitry 410, clock generator circuitry 412, multiplexor circuitry 414, serializer circuitry 416, de-serializer circuitry 418, clock data recovery (CDR) circuitry 420, and external interface circuitry 422, all interconnected substantially as shown. The internal interface 402 forwards the incoming high speed data 403a and clock 403c to other portions of the target 102, and exchanges low speed data 401b and configuration data 401c with other portions of the target. The external interface 422 conveys the outgoing serialized data 417 to the serial signal link 101, and conveys the incoming serial data 423 from the serial signal link 101.

The incoming serial data signal 423 is monitored by the CDR circuit 420 which recovers the embedded clock signal in accordance with well known principles. Based on this recovered clock signal, the CDR circuitry 420 provides a clock signal 421a to the clock generator 412, and multiple clock signals 421b, 421c to the de-serializer 418 and serializer 416. In turn, the clock generator 412 provides a related clock signal 413a to the low speed encoder 408 and high speed decoder 410. Additionally, this clock generator 412 provides further related clock signals 413b, 413c to the memory 404 and spread spectrum clock generator 406. Further in turn, the spread spectrum clock generator 406, in accordance with its clock signal 413.c, provides additional clock signals 407a, 407b, to the internal interface 402 and memory 404.

Low speed data 403b conveyed via the internal interface 402 is stored in the memory 404. This low speed data 405b is provided to the low speed encoder 408 which, in accordance with its clock signal 413a, encodes the low speed data into the data symbol 409 (discussed in more detail below). The multiplexor 414, in accordance with the control signal 401f, selects between the data signal 409 and other data 401e (e.g., test data), with the selected data 415 being provided to the serializer 416. The serializer 416, in accordance with its clock signals 421c, serializes the incoming data 415 and embeds the clock to provide the serialized data symbol 417, which is conveyed by the external interface 422 to the serial signal link 101.

The de-serializer 418, in accordance with its clock signals 421b, de-serializes the incoming data 423. The high speed decoder 410, in accordance with its clock signal 413a, decodes this data 419 to provide decoded high speed data 411 for storage in the memory 404. This high speed data 405a is provided to the internal interface 402 for conveyance to other portions of the target 102.

Figure 5:
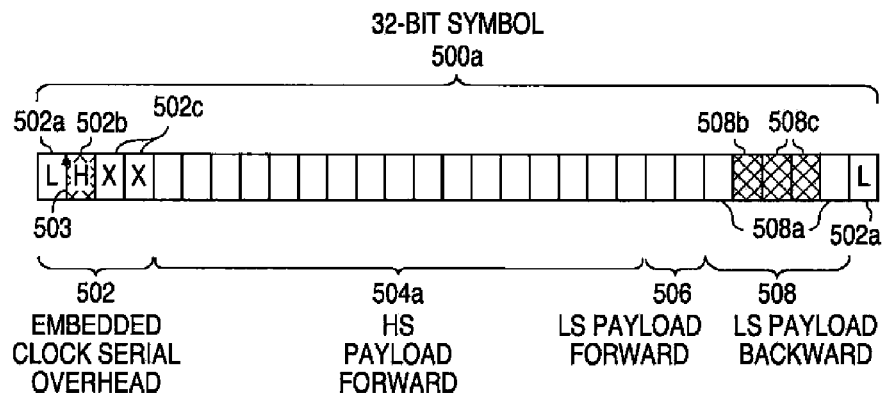
FIGS. 5 and 6 depict the symbols for longer and shorter, respectively, serial signals for use in the chipset of FIG. 2.
Figure 6:
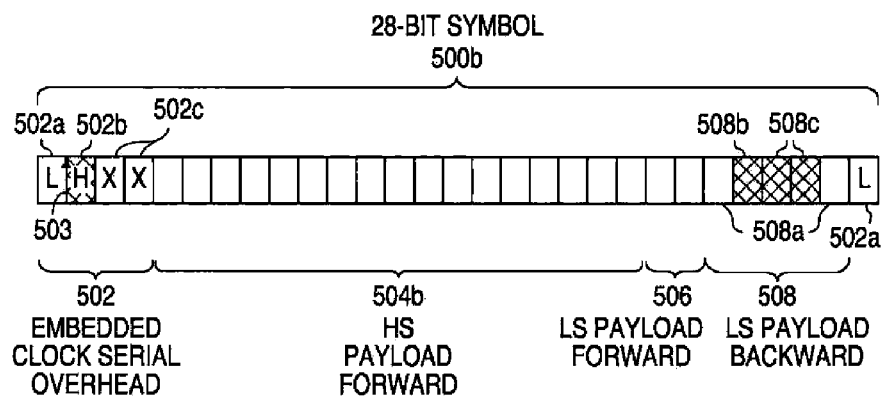

Referring to FIGS. 5 and 6, the serialized data symbol, in accordance with a preferred embodiment of the presently claimed invention, can include either a 32-bit symbol 500a or a 28-symbol 500b. The larger symbol 500a includes a high speed data payload 504a of 21 bits, while the smaller data symbol 50b includes a high speed data payload 504b of 17 bits. Both symbols 500a, 500b share common embedded clock and serial overhead 502, forward low speed data payloads 506, and return low speed data payloads 508.

The embedded clock and serial overhead 502 includes two bits 502a and 502b with low and high signal states, respectively, which define a low-to-high signal transition 503. (The first bit 502a, which is also represented at the opposite end of the symbols 500a, 500b, can be considered either the first bit of the symbol 500a, 500b, or the last bit of the preceding symbol.) The mutually opposing signal states of these two bits 502a, 502b help to maintain DC balancing for the external interface circuits 322, 422, and define the location for the signal transition 503 to ensure proper embedding of the clock signal in the symbol by the serializers 316, 416.

Two additional bits 502c provide information needed for encoding by the high speed encoder 308 and low speed encoder 408. One of these bits 502c (DCA) identify characteristics of the serial signal link 101, while the bit (DCB) cooperates with the first bit DCA to support the AC coupling of the signal link 101.

The forward low speed data payloads 506 contain two bits allocated to the low speed data provided in the forward direction, i.e., from the host 100 to the target 102. These data bits 506 are encoded by the high speed encoder 308 and decoded by the high speed decoder 410 along with the high speed data payloads 504a, 504b.

The return low speed data payloads 508 include two buffer bits 508a, a control bit 508b and two balance bits 508c. The control bit 508b provides control information in the reverse direction, while the balance bits 508c help maintain DC balance for the AC coupled signal interface 101. The buffer bits 508a provide temporal buffering for the other bits 508b, 508c.

As will be readily appreciated by one of ordinary skill in the art, the actual bit lengths of the high speed data payloads 504a, 504b and low speed data payloads 506, 508 can vary in accordance with a particular application or implementation.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a time shared bi-directional serial signaling system, comprising:
   a differential signal path to convey a serial data signal having a data signal interval including first, second and third subintervals and an embedded clock;
   host transceiver circuitry coupled to said differential signal path, responsive to reception of a data clock, a plurality of primary forward data and a plurality of secondary forward data by providing primary and secondary forward portions of said serial data signal and said embedded clock as a forward portion of said serial data signal during at least said first and second subintervals, and responsive to reception of a return portion of said serial data signal by retrieving a plurality of return data; and
   target transceiver circuitry coupled to said differential signal path, responsive to reception of said forward portion of said serial data signal by retrieving said data clock, said plurality of primary forward data and said plurality of secondary forward data, and responsive to reception of a plurality of return data by providing said return portion of said serial data signal during said third subinterval.

2. The apparatus of claim 1, wherein said differential signal path is AC-coupled.

3. The apparatus of claim 1, wherein said host transceiver circuitry comprises:
   clock circuitry responsive to said data clock by providing a plurality of host clock signals;
   forward data transmission circuitry coupled to said clock circuitry and responsive to one or more of said plurality of host clock signals, said plurality of primary forward data and said plurality of secondary forward data by providing said forward portion of said serial data signal;
   return data retrieval circuitry coupled to said clock circuitry and responsive to one or more of said plurality of host clock signals and said return portion of said serial data signal by providing said plurality of return data; and
   interface circuitry coupled between said forward data transmission circuitry, said return data retrieval circuitry and said differential signal path to convey said forward and return portions of said serial data signal.

4. The apparatus of claim 3, wherein said clock circuitry comprises:
   internal clock circuitry responsive to reception of said data clock by providing one or more internal clock signals as a portion of said plurality of host clock signals; and
   interface clock circuitry coupled to said internal clock circuitry and responsive to at least one of said one or more internal clock signals by providing one or more interface clock signals as another portion of said plurality of host clock signals.

5. The apparatus of claim 3, wherein said forward data transmission circuitry comprises:
   data encoding circuitry responsive to at least one of said plurality of host clock signals, said plurality of primary forward data and said plurality of secondary forward data by providing a plurality of encoded forward data; and
   data serializing circuitry coupled to said data encoding circuitry, and responsive to at least one of said plurality of host clock signals and said plurality of encoded forward data by providing said forward portion of said serial data signal.

6. The apparatus of claim 3, wherein said return data retrieval circuitry comprises:
   data de-serializing circuitry responsive to at least one of said plurality of host clock signals and said return portion of said serial data signal by providing a plurality of encoded return data; and
   data decoding circuitry coupled to said data de-serializing circuitry and responsive to at least one of said plurality of host clock signals and said plurality of encoded return data by providing said plurality of return data.

7. The apparatus of claim 3, wherein said interface circuitry comprises low voltage differential signal circuitry.

8. The apparatus of claim 1, wherein said target transceiver circuitry comprises:
   clock circuitry responsive to said forward portion of said serial data signal by retrieving said data clock and providing a plurality of target clock signals;
   forward data retrieval circuitry coupled to said clock circuitry and responsive to at least one of said plurality of target clock signals and said forward portion of said serial data signal by retrieving said plurality of primary forward data and said plurality of secondary forward data;
   return data transmission circuitry coupled to said clock circuitry and responsive to at least one of said plurality of target clock signals and said plurality of return data by providing said return portion of said serial data signal; and
   interface circuitry coupled between said forward data retrieval circuitry, said return data transmission circuitry and said differential signal path to convey said forward and return portions of said serial data signal.

9. The apparatus of claim 8, wherein said clock circuitry comprises:
   interface clock circuitry responsive to said data clock by providing one or more interface clock signals as a portion of said plurality of target clock signals; and
   internal clock circuitry coupled to said interface clock circuitry and responsive to at least one of said one or more interface clock signals by providing one or more internal clock signals as another portion of said plurality of target clock signals.

10. The apparatus of claim 8, wherein said forward data retrieval circuitry comprises:
    data de-serializing circuitry responsive to at least one of said plurality of target clock signals and said forward portion of said serial data signal by providing a plurality of de-serialized forward data; and
    data decoding circuitry coupled to said data de-serializing circuitry and responsive to at least one of said plurality of target clock signals and said plurality of de-serialized forward data by providing said plurality of primary forward data and said plurality of secondary forward data.

11. The apparatus of claim 8, wherein said return data transmission circuitry comprises:
    data encoding circuitry responsive to at least one of said plurality of target clock signals and said plurality of return data by providing a plurality of encoded return data; and
    data serializing circuitry coupled to said data encoding circuitry and responsive to at least one of said plurality of host clock signals and said plurality of encoded return data by providing said return portion of said serial data signal.

12. The apparatus of claim 8, wherein said interface circuitry comprises low voltage differential signal circuitry.

13. An apparatus including a time shared bi-directional serial signaling system, comprising:
    differential signal means for conveying a serial data signal having a data signal interval including first, second and third subintervals and an embedded clock;
    host transceiver means for receiving a data clock, a plurality of primary forward data and a plurality of secondary forward data and in response thereto providing primary and secondary forward portions of said serial data signal and said embedded clock as a forward portion of said serial data signal during at least said first and second subintervals, and for receiving a return portion of said serial data signal and in response thereto retrieving a plurality of return data; and
    target transceiver means for receiving said forward portion of said serial data signal and in response thereto retrieving said data clock, said plurality of primary forward data and said plurality of secondary forward data, and for receiving a plurality of return data and in response thereto providing said return portion of said serial data signal during said third subinterval.

* * * * *